No. 682,029. Patented Sept. 3, 1901.
H. B. CARLTON & C. E. HUTCHINGS.
EXTENSION BED FOR PHOTOGRAPHIC CAMERAS.
(Application filed May 18, 1901.)
(No Model.) 2 Sheets—Sheet 1.
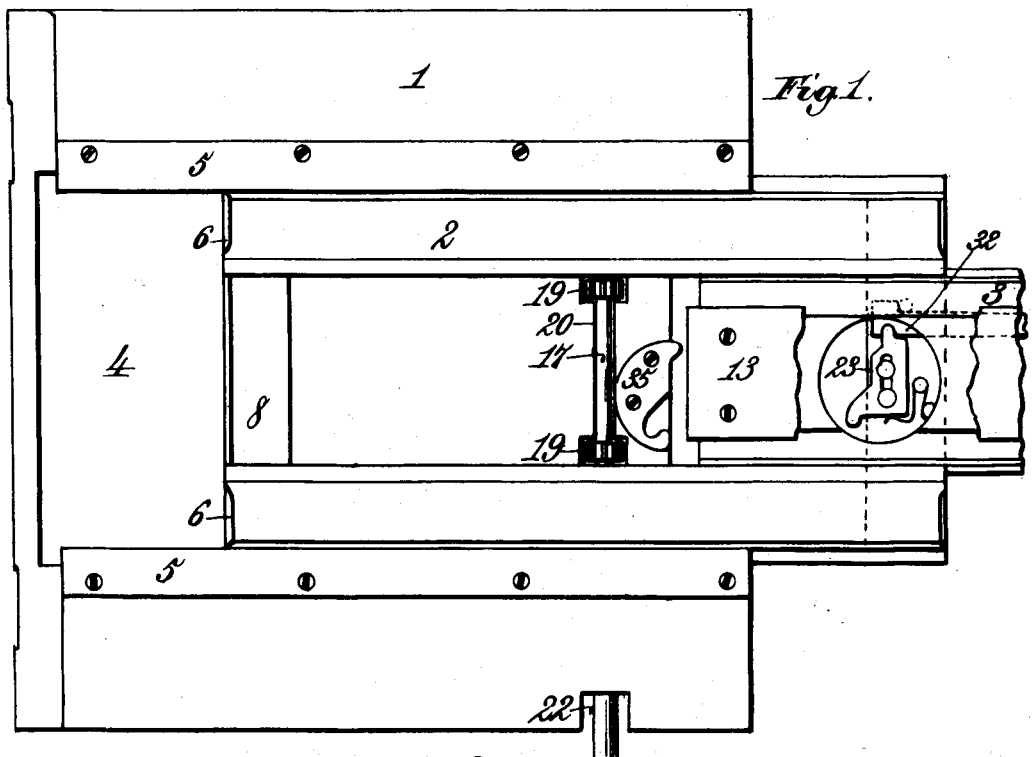
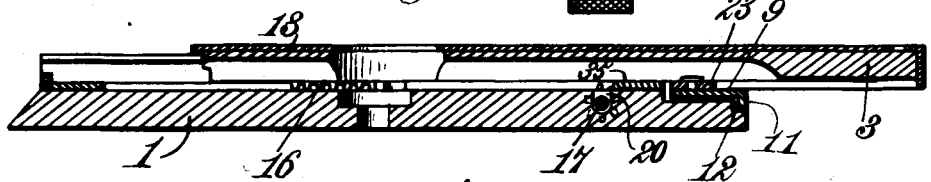
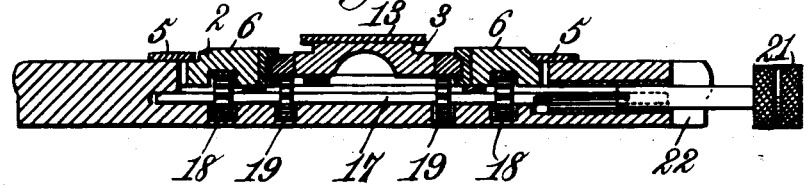
Witnesses,
Robert Everitt,
Bruce D. Elliott.
Inventors,
Harvey B. Carlton,
Charles E. Hutchings,
By James L. Norris,
Atty.

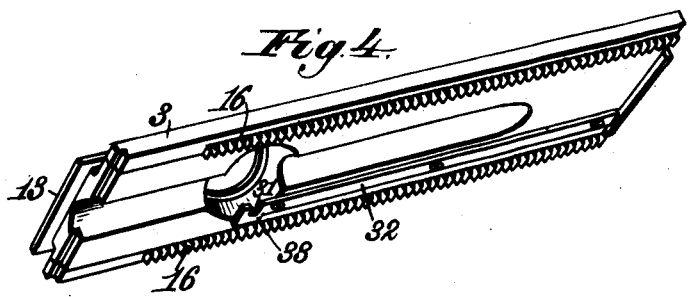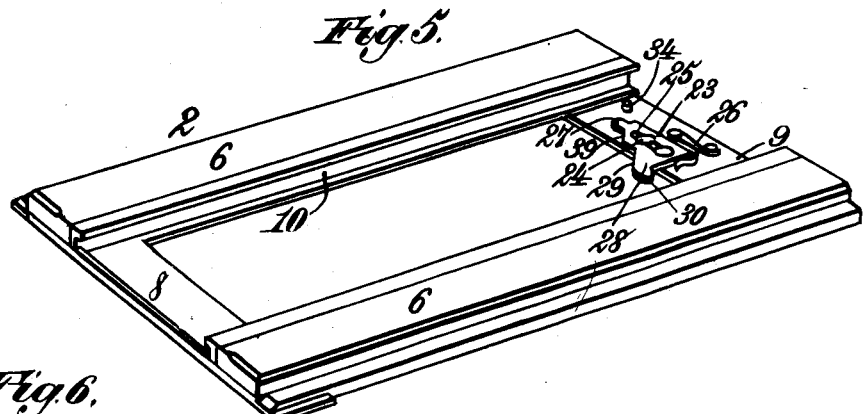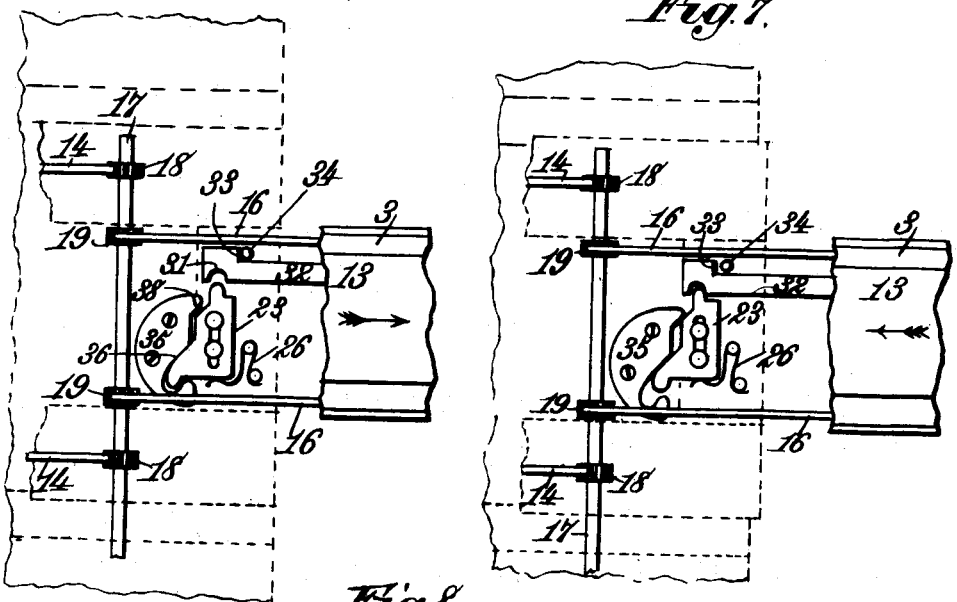

UNITED STATES PATENT OFFICE.

HARVEY B. CARLTON AND CHARLES E. HUTCHINGS, OF ROCHESTER, NEW YORK, ASSIGNORS TO ROCHESTER OPTICAL AND CAMERA COMPANY, OF SAME PLACE.

EXTENSION-BED FOR PHOTOGRAPHIC CAMERAS.

SPECIFICATION forming part of Letters Patent No. 682,029, dated September 3, 1901.

Application filed May 18, 1901. Serial No. 60,870. (No model.)

*To all whom it may concern:*

Be it known that we, HARVEY B. CARLTON and CHARLES E. HUTCHINGS, citizens of the United States, residing at Rochester, in the county of Monroe and State of New York, have invented new and useful Improvements in Extension-Beds for Photographic Cameras, of which the following is a specification.

Our invention relates to extension-beds for photographic cameras, the same residing particularly in an improved construction of lock and lock-releasing mechanism for the different sections.

The object of the invention is to provide in connection with a plurality of extension-sections and the operating means therefor novel means whereby the sections may be automatically locked to each other when one of the same reaches the limit of its outward movement and novel means whereby the said sections may be automatically released from their locking engagement and one of the same locked to an independent part when it reaches the limit of its inward movement.

Other objects and advantages of the invention will hereinafter appear and the novel features thereof will be set forth in the claims.

In the drawings forming part of this specification, Figure 1 is a plan view of our improved extension-bed. Fig. 2 is a central longitudinal section of the same. Fig. 3 is a transverse section taken in line with the operating-shaft for the different sections. Fig. 4 is a detail perspective view of one of the sections, showing the under side thereof. Fig. 5 is a similar view of the other section, showing the upper side thereof. Figs. 6 and 7 are detail plan views showing the locking device in two different positions, and Fig. 8 is a sectional detail.

Like reference-numerals indicate like parts in the different views.

Our improved bed is made up of the bed-plate 1, which may consist of the hinged front of a photographic camera, and the extension-sections 2 and 3, respectively. The section 2 is seated in a recess or channel 4 in the bed-plate 1 and is adapted to slide thereon, the same being guided in its movements and held from detachment by means of the confining or guide strips 5. The said section 2 is made up of the side bars 6 6, connected together and spaced apart at their opposite ends by the plates 8 9, forming a skeleton rectangular frame. The inner edges of the side bars 6 of the section 2 are formed with grooves or guideways 10, in which is mounted and adapted to slide the section 3. The front plate 9, which connects the side bars 6 of the section 2, is formed with a downwardly-extending flange 11, which is adapted to fit within the recess 12 in the forward edge of the bed-plate 1 when the section 2 is in its retracted position. On the upper surface of the section 3 is secured a plate 13, by means of which and suitable fastening devices the lens-carrier may be connected with said section.

Seated in grooves on the under side of the section 2 are the racks 14, which lie flush with the lower surface of said section. The forward or outer ends of the racks 14 terminate a short distance from the forward ends of the grooves in which they are seated, leaving recesses or depressions 15 for a purpose which will presently appear. Secured to the under side of the section 3 and projecting downwardly therefrom are the racks 16, whose lower edges lie in the same plane with the lower surface of the section 2, and consequently with the racks 14. Coöperating with the racks 14 and 16 and constituting in connection therewith the operating means for the different sections is a rotary shaft 17, having pinions 18 and 19 thereon, the pinions 18 being adapted to engage the racks 14 on the section 2 and the pinions 19 adapted to engage the racks 16 on the section 3. The said shaft 17 is seated in an open shaft channel or groove 20 in the bed-plate 1 and is provided with an extensible handle or thumb-piece 21, which is adapted to be drawn outwardly independently of said shaft when it is desired to turn the latter and to be forced inwardly into a recess 22 in the edge of the bed-plate 1 when it is desired to fold said bed-plate up into or against the body or case of the camera. When the section 2 is in its normal or retracted position, the pinions 18 lie within the recesses or depressions 15 at the ends of the grooves in which the racks 14 are seated. Said pinions are therefore out of engagement with the racks 14 and the shaft 17 may be turned in either direction without effecting any movement of the section 2.

Our improved lock and lock-releasing mechanism will now be described.

Secured to the upper surface of the plate 9, which connects the forward or outer ends of the bars 6 of the section 2, and located beneath the section 3 is a locking device 23. The same consists of a locking-plate slidingly mounted on the plate 9 and capable of lateral movement with respect to the sections 2 and 3. The means of connection by which this lateral movement is provided for consists of the headed pins or studs 24, secured to the plate 9 and extending through an elongated slot 25 in the locking-plate 23. The said locking-plate is acted upon by a spring 26, which tends to normally urge the same toward the limit of its lateral movement in one direction. The said plate is formed on one side with a tooth or projection 27, and also has formed thereon a tailpiece 28, having an incline 29 thereon and a tooth or projection 30, extending in a direction opposite that of the tooth or projection 27. The tooth 27 on the locking-plate 23 is adapted to engage a notch or recess 31 in the free end of a metallic strip or plate 32, secured to the under side of the section 3. The said strip 32 has one surface thereof adjacent to the notch 31 therein parallel with the sides of the section 3 and against which the tooth 27 is adapted to bear, as will presently appear. The said plate or strip 32 is also provided on the side thereof opposite the notch or recess 31 with a lateral projection, forming a shoulder 33. The said shoulder is itself adapted to engage a pin 34 on the upper surface of the plate 9 for limiting the outward movement of the section 3 independent of the section 2. The tailpiece 28 on the locking-plate 23 and the tooth or projection 30 thereon coöperate with a plate 35, secured to the upper surface of the bed-plate 1 and located between the side bars 6 of the section 2. The said plate 35 constitutes a releasing device for the lock 23 and also coöperates with the plate 23 for bringing about a locking action between the section 2 and the bed-plate 1. For this purpose said plate 35 is formed with an incline 36, adapted to engage the incline 29 on the tailpiece 28 for moving the locking-plate 23 in opposition to the spring 26 and causing the disengagement of the tooth 27 from the notch 31 in the strip 32, and is also formed, adjacent to the incline 36, with a hook 37, with which the tooth or projection 30 is adapted to be moved into locking engagement. In addition the plate 35 is formed with a projection 38 on the side opposite the hook 37, which is adapted to coöperate with a supplemental incline 39 on the plate 23 adjacent to the tooth or projection 27.

Constructed as above described the operation of our device is as follows, it being assumed that the sections 2 and 3 of the bed are in their retracted positions: When the section 2 is in this position, the pinions 18 on the operating-shaft 17 lie within the recesses or depressions 15 at the ends of the racks 14. The said pinions are therefore out of engagement with said racks 14, and a turning movement of the shaft 17 will have no effect upon the section 2. The pinions 19 on the shaft 17 are, however, in mesh with the racks 16 on the section 3. If now it be desired to extend the section or bed, it is merely necessary to turn the operating-shaft 17 in the proper direction. When this is done, the section 3 will be moved outwardly, and the movement thereof may be continued until the same reaches the limit of its independent outward movement. When this point is reached, the shoulder 33 on the strip 32, secured to the section 3, is brought into engagement with the pin 34 on the plate 9, connected with the section 2, and then the further outward movement of the section 3, due to the engagement of the pinions 19 with the racks 16, will move with it the section 2 and force the racks 14 thereon into engagement with the pinions 18 of the operating-shaft 17. As soon, however, as the section 2 begins to be moved outwardly the locking-plate 23, which is carried by said section, is moved away from the plate 35, which is secured to the bed-plate 1. The inclines 29 and 39 on the plate 23 are therefore thrown out of engagement with the incline 36 and the projection 38 on the plate 35. When this disengagement of these parts takes place, the locking-plate 23 is shifted laterally through the action of the spring 26 thereon and the tooth 27 on said plate is thrown into engagement with the notch or recess 31 in the strip or plate 32. The sections 2 and 3 are now locked together, and the pinions 18 on the operating-shaft 17 are in engagement with the racks 14 on the section 2. Further turning movement of the operating-shaft 17 in the same direction as before will therefore move both of the sections 2 and 3 outwardly together. When it is desired to retract the sections 2 and 3, the operating-shaft 17 is turned in the opposite direction. The pinions 18 on said shaft being in mesh with the racks 14 on the section 2 and both of said sections being locked together this turning movement of the shaft 17 will move both the sections 2 and 3 rearwardly until the incline 29 on the locking-plate 23 comes into engagement with the incline 36 on the plate 35. After this engagement takes place a slight further rearward or inward movement of the section 2 is caused by the engagement of one wall of the notch 31 with the tooth 27, and the locking-plate 23 is moved laterally against the action of the spring 26, so as to disengage the tooth 27 thereon from the notch or recess 31 in the strip or plate 32 and to throw the tooth or projection 30 on said plate into locking engagement with the hook 37 on the plate 35. The sections 2 and 3 are thereby unlocked from each other and the section 2 is locked to the bed-plate 1. Movement of said section in either direction is thereby prevented, although independent movement of the section 3 to the rear is permissible. When the sections 2 and 3 are unlocked in the manner just described, they are held unlocked, and the tooth or projection 30 is held in locking engagement with the hook 37 by reason of the fact that the tooth 27 on the plate 23 bears against the straight or parallel elongated edge of the strip or plate 32. When in this position, the pinions 18 on the operating-shaft 17 lie within the recesses or depressions 15 at the ends of the racks 14, and the pinions 19 on the operating-shaft 17 are in mesh with the racks 16 on the section 3. Further turning movement of the operating-shaft 17 in the same direction as before will now retract the section 3 independently of the section 2.

It should be stated in this connection that the forward ends of the racks 16 terminate a short distance from the forward end of the section 3, to which they are secured, so that when the section 3 is in its outward or extended position the ends of the racks 16 will but slighty intersect or overlap the line of connection between the recesses or depressions 15 in the section 2. This construction is provided for the obvious purpose of enabling the pinions 18 and 19 to engage, respectively, both the racks 14 and 16 for a short distance and during the time that the locking-plate 23 is being shifted in one direction or the other.

Having now described our invention, what we claim as new, and desire to secure by Letters Patent, is—

1. In an extension-bed for cameras, the combination with a plurality of sections, means for extending the same, and a support on which said sections are mounted, of a laterally-movable locking device for connecting said sections with each other, and means for releasing said locking device from its engagement with one of said sections and for throwing it into engagement with said support, as and for the purpose set forth.

2. In an extension-bed for cameras, the combination with a plurality of sections, means for extending the same, and a support on which said sections are mounted, of a laterally-movable locking device carried by one of said sections and adapted to coöperate with the other of said sections and with said support, and means for releasing said locking device from the part with which it is in engagement and for throwing it into locking engagement with the other, as and for the purpose set forth.

3. In an extension-bed for cameras, the combination with a plurality of sections, means for extending the same, and a support on which said sections are mounted, of a locking device carried by one of said sections and adapted to coöperate with the other of said sections and with said support, and means on said support for releasing said locking device from its engagement with one of said sections, and for throwing the same into locking engagement with said support, as and for the purpose set forth.

4. In an extension-bed for cameras, the combination with a plurality of sections, means for extending the same, and a support on which said sections are mounted, of a locking device carried by one of said sections, coöperating means therefor on the other of said sections and on said support, and means for releasing said locking device from its engagement with the coöperating means on said section and for throwing the same into locking engagement with the coöperating means on said support, as and for the purpose set forth.

5. In an extension-bed for cameras, the combination with a plurality of sections, means for extending the same, and a support on which said sections are mounted, of a laterally-movable locking device for locking one of said sections to said support, the said locking device being automatically disengaged from the said support and thrown into locking engagement with both of said sections when the other of said sections reaches the limit of its movement in one direction, as and for the purpose set forth.

6. In an extension-bed for cameras, the combination with a plurality of sections, means for extending the same, and a support on which said sections are mounted, of a laterally-movable locking device for locking one of said sections to said support, the said device being normally maintained in such locking position by the other of said sections and automatically disengaged therefrom and automatically thrown into locking engagement with both of said sections when said other section reaches the limit of its movement in one direction, as and for the purpose set forth.

7. In an extension-bed for cameras, the combination with a plurality of sections, means for extending the same, and a support on which said sections are mounted, of a laterally-movable spring-actuated locking device for locking one of said sections to said support, and engaging means on the other of said sections acting upon said device for maintaining the same in such locking position, the said device being automatically moved out of engagement with said support and into locking engagement with both of said sections when the engaging means on said other section passes out of contact with the same, as and for the purpose set forth.

8. In an extension-bed for cameras, the combination with a plurality of sections, means for extending the same, and a support on which said sections are mounted, of a laterally-movable locking-plate on one of said sections having an incline thereon, coöperating locking means for said plate on said support and on the other of said sections, a spring acting upon said locking-plate for normally urging the same toward one of said coöperating means, and an incline on said support adapted to engage the incline on said locking-plate for moving the same in opposition to said spring and into engagement with the other of said coöperating means, as and for the purpose set forth.

9. In an extension-bed for cameras, the combination with a plurality of sections, means for extending the same and a support on which said sections are mounted, of a laterally-movable locking-plate on one of said sections having an incline and two teeth thereon, a spring acting upon said locking-plate for normally urging it in one direction, a plate on said support having an incline thereon adapted to engage the incline on said locking-plate for moving the latter in opposition to said spring, a hook on said support adapted to be engaged by one of the teeth on said locking-plate, and a strip on the other of said sections adapted to engage said locking-plate for holding the same in locking engagement with said hook, and having a notch therein for receiving the other of said teeth, as and for the purpose set forth.

10. In an extension-bed for cameras, the combination with a plurality of sections, means for extending the same, and a support on which said sections are mounted, of a laterally-movable locking-plate on one of said sections having an incline and two teeth thereon, a spring acting upon said locking-plate for normally urging it in one direction, a plate on said support having an incline thereon adapted to engage the incline on said locking-plate for moving the latter in opposition to said spring, and having an integral hook thereon adjacent to its incline adapted to be engaged by one of the teeth on said locking-plate, and a strip on the other of said sections adapted to engage said locking-plate for holding the same in locking engagement with said hook, and having a notch therein for receiving the other of said teeth, as and for the purpose set forth.

11. In an extension-bed for cameras, the combination with a plurality of sections, means for extending the same, and a support on which said sections are mounted, of a laterally-movable locking-plate on one of said sections having an incline thereon, coöperating locking means for said plate on said support and on the other of said sections, a spring acting upon said locking-plate for normally urging the same toward one of said coöperating means, a pin on one of said sections and a shoulder on the other of said sections adapted to be brought into contact with each other when one of said sections reaches the limit of its independent movement in one direction, and an incline on said support adapted to engage the incline on said locking-plate for moving the same in opposition to said spring and into engagement with the other of said coöperating means, as and for the purpose set forth.

12. In an extension-bed for cameras, the combination with a plurality of sections, means for extending the same and a support on which said sections are mounted, of a transverse plate on one of said sections having a pin thereon, a laterally-movable locking-plate on said transverse plate having an incline and two teeth thereon, a spring acting upon said locking-plate for normally urging it in one direction, a plate on said support having an incline thereon adapted to engage the incline on said locking-plate for moving the latter in opposition to said spring, a hook on said support adapted to be engaged by one of the teeth on said locking-plate, and a strip on the other of said sections adapted to engage said locking-plate for holding the same in locking engagement with said hook, and having a notch therein and a shoulder thereon, the said notch being adapted to receive the other of the teeth on said locking-plate, and the said shoulder being adapted to engage the pin on said transverse plate, as and for the purpose set forth.

In testimony whereof we have hereunto set our hands in presence of two subscribing witnesses.

HARVEY B. CARLTON.
CHARLES E. HUTCHINGS.

Witnesses:
JACOB CALL,
JOHN MACGREGOR.